(12) United States Patent
Honoosic

(10) Patent No.: US 6,372,272 B2
(45) Date of Patent: Apr. 16, 2002

(54) CAKE IN A CAN KIT

(76) Inventor: Mark S. Honoosic, 178 Courtdale Ave., Courtdale, PA (US) 18704

( * ) Notice: Subject to any disclaimer, the term of this patent is extended or adjusted under 35 U.S.C. 154(b) by 0 days.

(21) Appl. No.: 09/776,847

(22) Filed: Feb. 6, 2001

Related U.S. Application Data

(60) Provisional application No. 60/181,080, filed on Feb. 8, 2000.

(51) Int. Cl.⁷ .......................... B65D 81/32; B65D 81/34
(52) U.S. Cl. ........................ 426/113; 426/87; 426/112; 426/120; 426/128; 426/126
(58) Field of Search ................. 426/128, 113, 426/112, 120, 124, 115, 87, 126

(56) References Cited

U.S. PATENT DOCUMENTS

| | | | |
|---|---|---|---|
| 1,411,223 A | * 3/1922 | Retzbach | 426/128 |
| 1,942,212 A | * 1/1934 | Heseltine | 426/128 |
| 2,039,374 A | * 5/1936 | Young | 426/113 |
| 2,858,220 A | * 10/1958 | Battiste | 426/128 |
| 2,917,221 A | * 12/1959 | Risdon | 426/128 |
| 2,948,624 A | * 8/1960 | Watson et al. | 426/128 |
| 2,960,218 A | * 11/1960 | Cheeley | 426/113 |
| 3,015,568 A | * 1/1962 | McClain | 426/128 |
| 3,488,201 A | 1/1970 | Pizarro | |
| 4,111,306 A | * 9/1978 | Ruccaforte | 426/113 |
| 4,219,219 A | 8/1980 | Zefran | |
| 4,304,335 A | * 12/1981 | Bemiss | 426/113 |
| 4,571,340 A | 2/1986 | Ferrante et al. | |
| 4,590,078 A | 5/1986 | Umina | |
| 5,045,333 A | 9/1991 | Petrofsky et al. | |

OTHER PUBLICATIONS

Food Processing Industry, p. 63 (Dialog Abstract 00381740 Item 6 from File 160), Feb. 1977.*
Wiley, Encyclopedia of Packaging Technology, J. Wiley & Sons, pp. 144–154, 1997.*
Comline Chemicals & Matils, p. 5 (Dialog Abstract 01434040, Item 9 from File 16), Dec. 4, 1990.*
Product Alert (Dialog Abstract 01831753, Item 44 from File 16), Aug. 26, 1991.*
Gormans New Product News, v. 27, n. 7, p. 19(2) (Dialog Abstract 05541994, Item 19 from File 148), Aug. 12, 1991.*
Product Alert v. 30, n. 9 (Dialog Abstract 02804482, Item 1 from File 9), May 8, 2000.*
Adweek's Marketing Week, v. 32, n. 45, p. 33(1) (Dialog Abstract 05525395, Item 8 from File 148), Nov. 4, 1991.*
U.S. Distribution Journal (Dialog Abstract 01445929, Item 1 from File 16), Dec. 15, 1990.*
Prepared Foods, v. 160, n. 11, p. 109 (Dialog Abstract 05496356, Item 9 from File 148), Oct. 1991.*
Gorman's New Product News, v. 33, n. 11, p. 54 (Dialog Abstract 10172195, Item 1 from File 148), Dec. 1997.*
Product Alert v. 29, n. 9 (Dialog Abstract 02456126, Item 1 from File 9), May 10, 1999.*

* cited by examiner

Primary Examiner—Steven Weinstein
(74) Attorney, Agent, or Firm—Richard C. Litman

(57) ABSTRACT

A kit comprising a decorative container or can which includes dry, packaged cake mix and a package of pre-mixed icing. The cake can be baked and stored in the container. The outer wall of the container is decorated with a heat-resistant paint.

2 Claims, 2 Drawing Sheets

CAKE IN A CAN KIT

CROSS-REFERENCE TO RELATED APPLICATION

This application claims the benefit of U.S. Provisional Patent Application Serial No. 60/181,080, filed Feb. 8, 2000.

BACKGROUND OF THE INVENTION

1. Field of the Invention

The present invention generally relates to containers. More specifically, the present invention is drawn to a kit which includes a decorative container or can for shipping and holding the dry, un-baked ingredients of a cake. The container or can also functions as the baking and storage receptacle for the finished cake.

2. Description of Related Art

Far less time is devoted to food preparation in modern households than was devoted in households of previous generations. To accommodate this trend, an ever-increasing amount of floor space at the Supermarket is devoted to easily prepared "convenience" food. Convenience food, however, has certain drawbacks in that such food may have been frozen or pre-prepared and stored in a manner which robs it of the fresh "homemade" taste that families (and singles) crave. A cake mixed from fresh, non-frozen "scratch" ingredients, which ingredients are conveniently stored and baked in an attractive container, would certainly be a welcome addition to the convenience food art.

Examples of prior art devices for storing cake dough in a frozen state prior to baking are disclosed in U.S. Pat. Nos. 4,571,340 (Ferrante et al.) and 5,045,333 (Petrofsky et al.).

U.S. Pat. No. 4,590,078 (Umina) shows a container for baking freshly prepared batter. The instant patent does not: contemplate the concept of providing a holding and shipping container for the pre-mixed batter ingredients.

A two-piece, decorative, storage container for a cake is disclosed in U.S. Pat. No. 4,219,119 (Zefran). There is no provision for using the container as a baking receptacle.

U.S. Pat. No. 3,488,201 (Pizarro) discloses a food container fabricated from aluminum foil.

None of the above inventions and patents, taken either singly or in combination, is seen to disclose a kit which includes a decorative container and an exact amount of ingredients for mixing a cake batter in the container, wherein the container also functions as a baking and storage receptacle for the finished cake as will subsequently be described and claimed in the instant invention.

SUMMARY OF THE INVENTION

The present invention is a cake-baking kit which includes a tapered metal container having a removable lid. The kit also includes an exact amount of packaged dry ingredients for making a cake batter. The metal container functions as a shipping and holding receptacle for the packaged ingredients, mixing bowl for the batter, baking pan, and decorative storage container for the finished cake. The amount of dry ingredients is pre-determined and packaged so that the cake will bake evenly and not dry out when baked in the container. The outer surfaces of the lid and container can be painted in various designs to accommodate different aesthetic tastes.

A pre-determined amount of icing may optionally be included in the kit, if desired.

Accordingly, it is a principal object of the invention to provide a kit which includes all materials necessary for preparing a cake for baking.

It is another object of the invention to provide a kit which includes a decorative container for holding and shipping the ingredients necessary for preparing a cake for baking.

It is a further object of the invention to provide a decorative container which is utilized as a baking pan.

Still another object of the invention is to provide a decorative container which is utilized as a storage receptacle for a finished cake.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
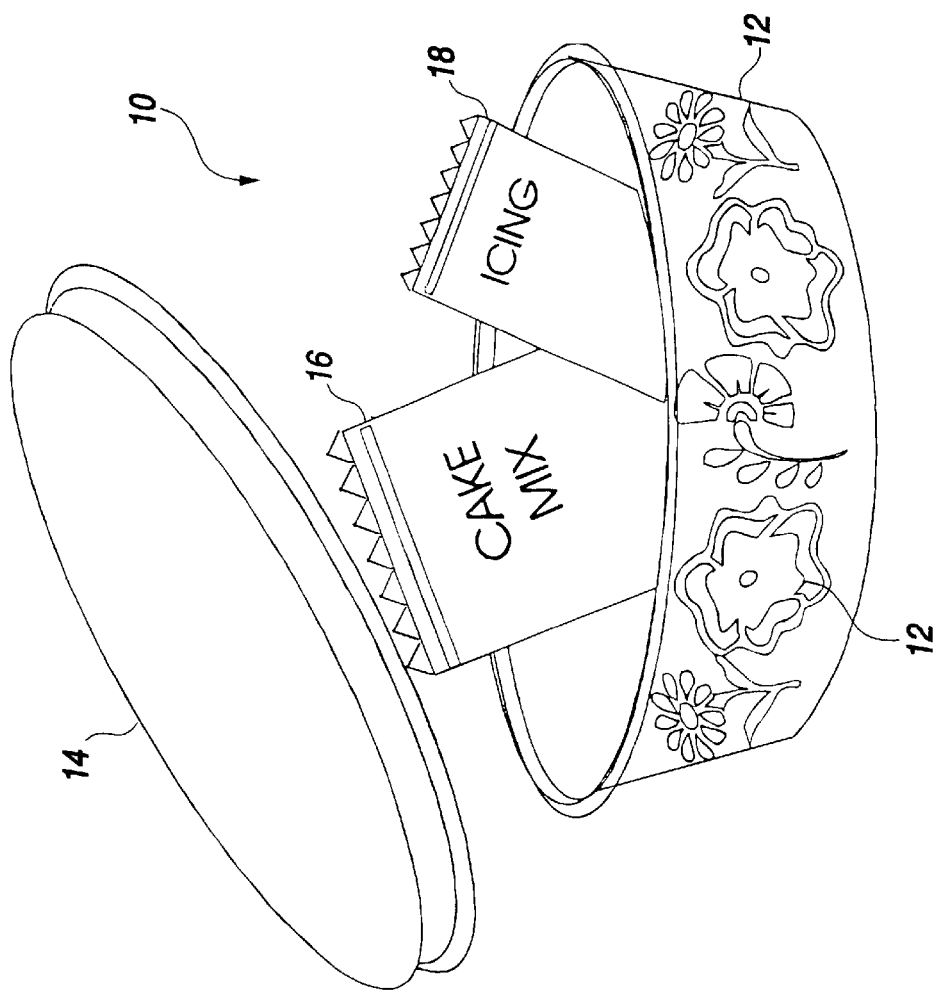
FIG. 1 is an environmental, perspective view of a cake kit according to the present invention.

As illustrated in FIG. 1, the present invention comprises a kit generally indicated at 10. The kit includes container 12, lid 14, packaged cake mix 16, and (optionally) packaged cake icing 18.

Container 12 is fabricated from a light-weight, sheet steel coated on both sides with tin plate. The container is of tapered configuration measuring approximately three and five-eighths inches in height and having a top diameter of approximately ten and one-fourth inches which tapers to a bottom diameter of approximately nine and one-eighth inches. Lid 14 is constructed of the same material as container 12. The lid is about one inch in height and has a diameter of about ten and one-fourth inches so as to engage and cover the top of container 12. The container is decorated on its outside surface with a layer of heat-resistant paint 12a. The paint is able to withstand heat of at least five-hundred degrees F. without degrading. The decorative designs may assume many different themes and color schemes to appeal to varied aesthetic interests. Although not shown, it is obvious that the lid can be decorated with a design to coordinate with the design of the container.

To successfully bake a cake in the above sized container, it has been determined that a precise amount (one and one-half pounds) of dry cake mix ingredients must be utilized. To this end, package 16 is provided with one and one-half pounds of dry cake mix. An icing amount of twelve ounces is adequate for covering the finished cake and that amount is provided in package 18.

Figure 2:
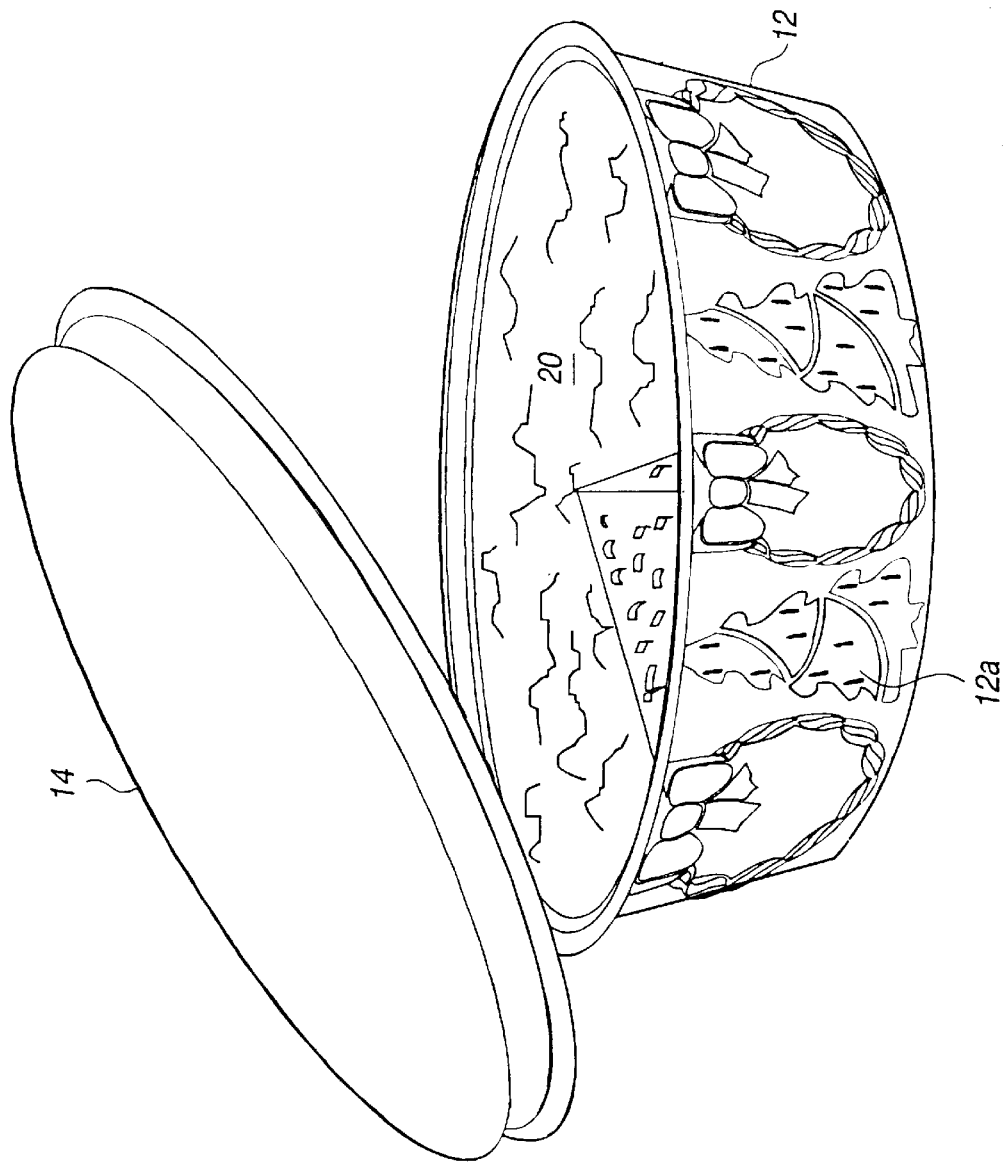
FIG. 2 is an environmental, perspective view of a finished cake stored in a decorative container according to the present invention.

In use, container 12 may be provided with a non-stick inner surface and function as a mixing bowl for blending the dry cake mix provided in package 16 with a liquid (water and/or milk) to form a cake batter. In the alternative, the ingredients may be mixed in a separate receptacle and container 12 coated as the recipe requires. When sufficiently blended, container 12 (with the batter therein) is placed in a pre-heated oven for a determined period until the cake is done. The cake may be iced at an appropriate time if desired. FIG. 2 is illustrative of the finished cake 20 with a slice removed. The finished cake may remain in container 12 for refrigerated storage. With lid 14 covering container 12, the cake will retain moisture and flavor for approximately two weeks.

It is to be understood that the present invention is not limited to the sole embodiment described above, but encompasses any and all embodiments within the scope of the following claims.

I claim:

1. A cake kit comprising:

a bakeable container, said container having a bottom wall, a tapered-circumferential side wall and an open top, said tapered circumferential side wall extending a distance from said bottom wall to said open top, wherein said distance from said bottom wall to said open top is three and five-eighths inches, and wherein said tapered-circumferential side wall has a diameter of approximately ten and one-fourth inches at said open top and a diameter of nine and one-eighth inches at said bottom wall, said bottom wall and said circumferential side wall fabricated from light-weight sheet steel coated with tin plate;

a removable and recloseable lid, said lid adapted to engage the top of the container and cover said open top of said container and to uncover and re-engage said top of the container to re-cover said open top of said container, said lid fabricated from light-weight sheet steel coated with tin plate;

said bottom wall, said circumferential side wall and said lid having respective non-stick inner surfaces;

a first packages said first package disposed in said container and containing one and one-half pounds of dry cake mix;

a second package, said second package disposed in said container and containing a precise amount of pre-mixed icing; and a heat-resistant decorative coating, said coating disposed on an outer surface of said circumferential side wall and capable of withstanding heat of at least five-hundred degrees F. without degrading;

said container capable of being shipped with said first and second package therin and, upon forming a batter from said dry cake mix, allowing said batter to be baked in said container to form a cake, said recloseable lid being capable of allowing said baked cake to retain moisture and flavor when stored in said container with said lid engaging the top of the container and covering said open top.

2. The kit according to claim 1, wherein said precise amount of pre-mixed icing is twelve ounces.

* * * * *